(12) United States Patent
Ganiger et al.

(10) Patent No.: US 11,674,397 B2
(45) Date of Patent: Jun. 13, 2023

(54) VARIABLE STIFFNESS DAMPER SYSTEM

(71) Applicant: General Electric Company, Schenectady, NY (US)

(72) Inventors: Ravindra Shankar Ganiger, Bangalore (IN); Praveen Sharma, Bangalore (IN); Naleen Kumar Verma, Bangalore (IN); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/950,940

(22) Filed: Nov. 18, 2020

(65) Prior Publication Data
US 2022/0154580 A1 May 19, 2022

(51) Int. Cl.
*F01D 5/10* (2006.01)
*F01D 25/16* (2006.01)

(52) U.S. Cl.
CPC ............. *F01D 5/10* (2013.01); *F01D 25/164* (2013.01); *F05D 2240/50* (2013.01); *F05D 2250/14* (2013.01); *F05D 2260/96* (2013.01)

(58) Field of Classification Search
CPC ........ F01D 25/04; F01D 25/164; F01D 5/027; F01D 5/10; F05D 2250/18;
(Continued)

(56) References Cited

U.S. PATENT DOCUMENTS 2,602,009 A 7/1952 Barlow et al.
4,044,977 A * 8/1977 Feucht .................... F16F 3/093
267/153

(Continued)

FOREIGN PATENT DOCUMENTS

DE 102006026123 B3 1/2008
GB 2111136 A 6/1983
(Continued)

OTHER PUBLICATIONS

Bhat et al., Analysis of High Load Dampers, NASA-CR-165503, National Aeronautics and Space Administration, Contract NAS3-22518, United Technology Corporation—Pratt & Whitney Aircraft Group, May 17, 1982, 98 Pages.

(Continued)

*Primary Examiner* — David E Sosnowski
*Assistant Examiner* — Wayne A Lambert
(74) *Attorney, Agent, or Firm* — Dority & Manning, P.A.

(57) ABSTRACT

A variable stiffness damper system including an inner spring positioned between a first wall and a second wall, in which the inner spring includes a first member and a second member each coupled together at a distal end by an inner bumper. The first member and the second member are each contoured toward one another. The first member, the second member, and the inner bumper form a cavity therebetween. An outer spring is positioned between the inner spring and the first wall or the second wall. The outer spring includes a spring arm contoured toward the inner spring. The outer spring includes an outer bumper positioned between the inner bumper and the first wall or the second wall. The inner bumper and the outer bumper are selectively couplable to one another based on a load applied to the damper system.

19 Claims, 7 Drawing Sheets

(58) Field of Classification Search
CPC .......... F05D 2260/96; F05D 2240/50; F05D 2240/53; F05D 2240/54; F05D 2250/14; F05D 2250/184; F05D 2230/22; F05D 2230/234; F05D 2230/31; F05D 2300/505; F16F 1/025; F16F 13/00; F16F 15/022; F16F 3/093; F16F 9/00; F16F 1/22; F16F 3/023; F16F 15/0237; F16F 2236/04; F16F 5/00; F16F 2230/007; F16C 27/06; F16C 32/0677; B22F 5/009; B33Y 80/00; Y02T 50/60

See application file for complete search history.

(56) References Cited

U.S. PATENT DOCUMENTS

| | | | |
|---|---|---|---|
| 4,084,861 A | 4/1978 | Greenberg et al. | |
| 4,178,046 A * | 12/1979 | Silver | F16C 17/10 384/103 |
| 4,262,975 A * | 4/1981 | Heshmat | F16C 17/024 384/119 |
| 4,496,252 A | 1/1985 | Horler et al. | |
| 4,527,910 A | 7/1985 | Fleming | |
| 4,867,655 A | 9/1989 | Barbic et al. | |
| 4,947,639 A | 8/1990 | Hibner et al. | |
| 4,992,024 A | 2/1991 | Heydrich | |
| 5,052,828 A | 10/1991 | Ciokajlo et al. | |
| 5,099,966 A | 3/1992 | Wohrl | |
| 5,102,107 A * | 4/1992 | Simon | F16F 3/093 267/152 |
| 5,169,241 A | 12/1992 | Singh | |
| 5,178,400 A | 1/1993 | Singh | |
| 5,205,652 A | 4/1993 | Chapman | |
| 5,320,134 A | 6/1994 | Singh | |
| 5,344,239 A | 9/1994 | Stallone et al. | |
| 5,372,431 A * | 12/1994 | Ide | F16C 17/035 384/122 |
| 5,421,655 A * | 6/1995 | Ide | F16F 15/0237 384/99 |
| 5,513,917 A * | 5/1996 | Ide | F01D 25/164 384/100 |
| 5,531,522 A * | 7/1996 | Ide | F16C 17/035 384/535 |
| 5,603,574 A * | 2/1997 | Ide | F16C 17/065 384/119 |
| 5,658,125 A | 8/1997 | Burns et al. | |
| 5,711,615 A | 1/1998 | Stitz et al. | |
| 6,536,953 B1 | 3/2003 | Cope et al. | |
| 6,796,408 B2 | 9/2004 | Sherwin et al. | |
| 7,097,413 B2 | 8/2006 | VanDuyn | |
| 7,267,196 B2 | 9/2007 | Mathur | |
| 7,329,048 B2 | 2/2008 | Klusman et al. | |
| 7,517,152 B1 | 4/2009 | Walsh | |
| 7,798,720 B1 | 9/2010 | Walsh | |
| 8,100,638 B2 | 1/2012 | Udall | |
| 8,182,153 B2 * | 5/2012 | Singh | F16C 27/066 384/477 |
| 8,430,622 B2 | 4/2013 | Webster et al. | |
| 8,434,533 B2 | 5/2013 | Albert et al. | |
| 8,662,756 B2 | 3/2014 | Care et al. | |
| 8,727,632 B2 | 5/2014 | Do et al. | |
| 8,834,095 B2 | 9/2014 | Davis | |
| 9,121,305 B2 | 9/2015 | Nicholson | |
| 9,121,448 B2 * | 9/2015 | Delgado Marquez | F16C 32/0622 |
| 9,140,137 B2 | 9/2015 | Mayer et al. | |
| 9,297,310 B2 | 3/2016 | Giri et al. | |
| 9,447,817 B2 | 9/2016 | Gallimore et al. | |
| 9,476,320 B2 | 10/2016 | Savela | |
| 9,540,946 B2 | 1/2017 | Boeck | |
| 9,546,570 B2 | 1/2017 | Fletcher et al. | |
| 9,638,062 B2 | 5/2017 | Davis | |
| 9,644,541 B2 | 5/2017 | Morreale et al. | |
| 9,746,029 B1 * | 8/2017 | Mook | F01D 25/164 |
| 9,777,592 B2 | 10/2017 | Denis et al. | |
| 9,777,596 B2 | 10/2017 | Raykowski et al. | |
| 9,856,751 B2 * | 1/2018 | Duong | F01D 25/164 |
| 9,909,451 B2 | 3/2018 | Carter et al. | |
| 10,240,529 B2 | 3/2019 | Savela | |
| 10,801,366 B2 * | 10/2020 | Ganiger | F16C 35/042 |
| 11,021,998 B2 * | 6/2021 | Ganiger | F16C 27/066 |
| 2006/0269357 A1 | 11/2006 | Webb | |
| 2009/0015085 A1 | 1/2009 | Nakajima | |
| 2010/0037462 A1 | 2/2010 | Pettinato et al. | |
| 2010/0220948 A1 | 9/2010 | Singh et al. | |
| 2011/0150378 A1 | 6/2011 | Care et al. | |
| 2013/0051982 A1 * | 2/2013 | Hindle | F01D 25/164 415/119 |
| 2016/0097301 A1 | 4/2016 | Rosenau et al. | |
| 2016/0341070 A1 * | 11/2016 | Garcia | F04D 29/526 |
| 2017/0030223 A1 | 2/2017 | Parry et al. | |
| 2017/0051629 A1 | 2/2017 | Sutherland | |
| 2017/0089220 A1 | 3/2017 | Carter et al. | |
| 2017/0089353 A1 * | 3/2017 | Zhang | F04D 29/164 |
| 2017/0145855 A1 | 5/2017 | Ganiger et al. | |
| 2017/0234158 A1 | 8/2017 | Savela | |
| 2017/0248191 A1 * | 8/2017 | Husband | F16C 27/045 |
| 2017/0307046 A1 | 10/2017 | Steen et al. | |
| 2017/0370376 A1 | 12/2017 | Kray et al. | |
| 2018/0245631 A1 | 8/2018 | Nakayama et al. | |
| 2018/0245632 A1 | 8/2018 | Obara et al. | |
| 2018/0298822 A1 | 10/2018 | Ac et al. | |
| 2019/0353052 A1 | 11/2019 | Ganiger et al. | |
| 2021/0123257 A1 * | 4/2021 | Mohammadi Darani | E04H 9/0237 |

FOREIGN PATENT DOCUMENTS

| | | |
|---|---|---|
| JP | H5-19641 U | 3/1993 |
| JP | H06200933 A | 7/1994 |
| JP | 2003-139134 A | 5/2003 |
| WO | WO2013/183519 A1 | 12/2013 |

OTHER PUBLICATIONS

Fleming, Dual Clearance Squeeze Film Damper for High Load Conditions, NASA-TM-83619, N84-25064, Nasa Technical Memorandum 83619, National Aeronautics and Space Administration, Joint Lubrication Conference, San Diego California, Oct. 22-24, 1984, 15 Pages.

Pratap et al., Squeeze Film Effects in MEMS Devices, Journal of the Indian Institute of Science, vol. 87, No. 1, Jan.-Mar. 2007, pp. 75-94.

Walton et al., Rotordynamic Evaluation of an Advanced Multi-Squeeze Film Damper—Imbalance Response and Bladeloss Simulation, International Gas Turbine and Aeroengine Congress and Exposition, Orlando, Florida, Jun. 3-6, 1991, 7 Pages.

* cited by examiner

VARIABLE STIFFNESS DAMPER SYSTEM

FIELD

The present subject matter relates generally to variable stiffness damper systems. The present subject matter relates particularly to variable stiffness damper systems for turbine engines.

BACKGROUND

Mechanical structures, including static casings surrounding rotary structures for systems such as turbine engines, generally include structural members providing a single linear stiffness, or load versus deflection, for each load member. However, linear stiffness structural members may provide limited ranges of operability relative to load or deflection behaviors of the mechanical structure to which the structural member is attached. There is a need for improved stiffness properties of load bearing structural members.

BRIEF DESCRIPTION

Aspects and advantages of the invention will be set forth in part in the following description, or may be obvious from the description, or may be learned through practice of the invention.

An aspect of the present disclosure is directed to a variable stiffness damper system including an inner spring positioned between a first wall and a second wall. The inner spring includes a first member and a second member each coupled together at a distal end by an inner bumper. The first member and the second member are each contoured toward one another. The first member, the second member, and the inner bumper form a cavity therebetween. An outer spring is positioned between the inner spring and the first wall or the second wall. The outer spring includes a spring arm contoured toward the inner spring. The outer spring includes an outer bumper positioned between the inner bumper and the first wall or the second wall. The inner bumper and the outer bumper are selectively couplable to one another based on a load applied to the damper system.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

As used herein, "wall" refers to a three-dimensional feature, such as including a length or radius, width, and depth. As used herein, "face" refers to a two-dimensional feature, such as including a length or radius and width.

As used herein, "unbalance" refers to an uneven distribution of mass around an axis of rotation. Unbalance generally results in a moment at a rotating mass or rotor, generally resulting in undesired vibrations, noise, whirl, or damage to surrounding casings or bearings. Unbalance may result from material addition or loss at a rotor, thermal distortion or uneven thermal energy addition or removal at a rotor, or mechanical stresses at a rotor.

Embodiments of a variable stiffness damper system are depicted and described herein. The damper system provided herein allows for elastic buckling behavior to absorb large magnitudes of mechanical energy without plastic deformation. Elastic buckling behavior at the damper system allows for reduced rotor dynamic responses under various turbine engine operating conditions. The variable stiffness damper system provided herein may provide benefits particular to high unbalance turbine engine operation, such as to mitigate damage arising from bowed rotor start, blade-out conditions, foreign object debris ingestion, or other eccentricities of a rotor assembly relative to an axial centerline, or other high unbalance operating conditions.

Embodiments of the damper system provided herein allow for energy absorption via elastic buckling to recover shape or form from large deformations. The damper system provided herein allows for advantages related to squeeze film dampers and shock absorbers to provide for high capacity damping. Additionally, embodiments of the damper system provided herein may allow for lower damping due to higher radial clearance, such as to provide improved cold stability margin for normal or nominal operation.

The damper system provided herein may provide benefits over known damper systems and other systems such as turbine engines. Benefits may include reduced responses during bowed rotor operation and high cycle fatigue unbalances. The damper system may additionally reduce non-synchronous vibrations, avoid rotor whirl, and provide stable operation under lubricant loss conditions. The damper system may reduce or eliminate turbine engine motoring (i.e., applying energy to rotate a rotor assembly without combustion), such may allow for reduced turnaround time for commercial aircraft operation, or particularly short-haul flights. The damper system provided herein may allow for reduced or tighter clearances between rotors and surrounding static structures, which allow for improved efficiency (e.g., at a compressor section or turbine section), which allows for reduced specific fuel consumption. Still further, embodiments of the damper system allow for reduced high cycle fatigue and related failures, lower non-synchronous vibrations (NSV), and lower engine-related vibration noise (EVRN). It should be appreciated that, when applied to aircraft turbine engines, such benefits may allow for engine and aircraft operation at conditions that may heretofore not be available to known aircraft and turbine engines.

Figure 1:
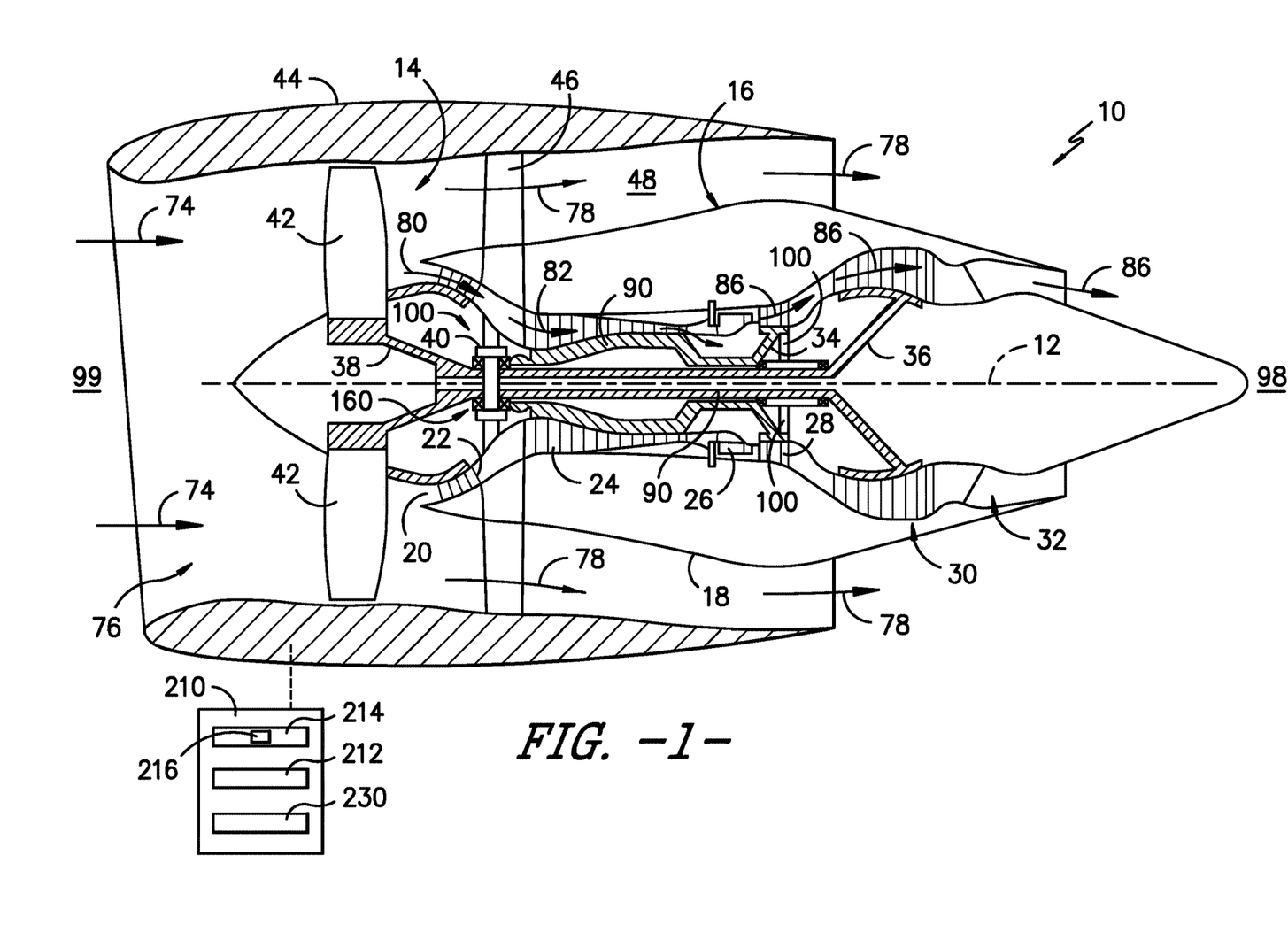
FIG. 1 is an exemplary embodiment of a turbine engine including a damper system according to an aspect of the present disclosure.
Figure 2:
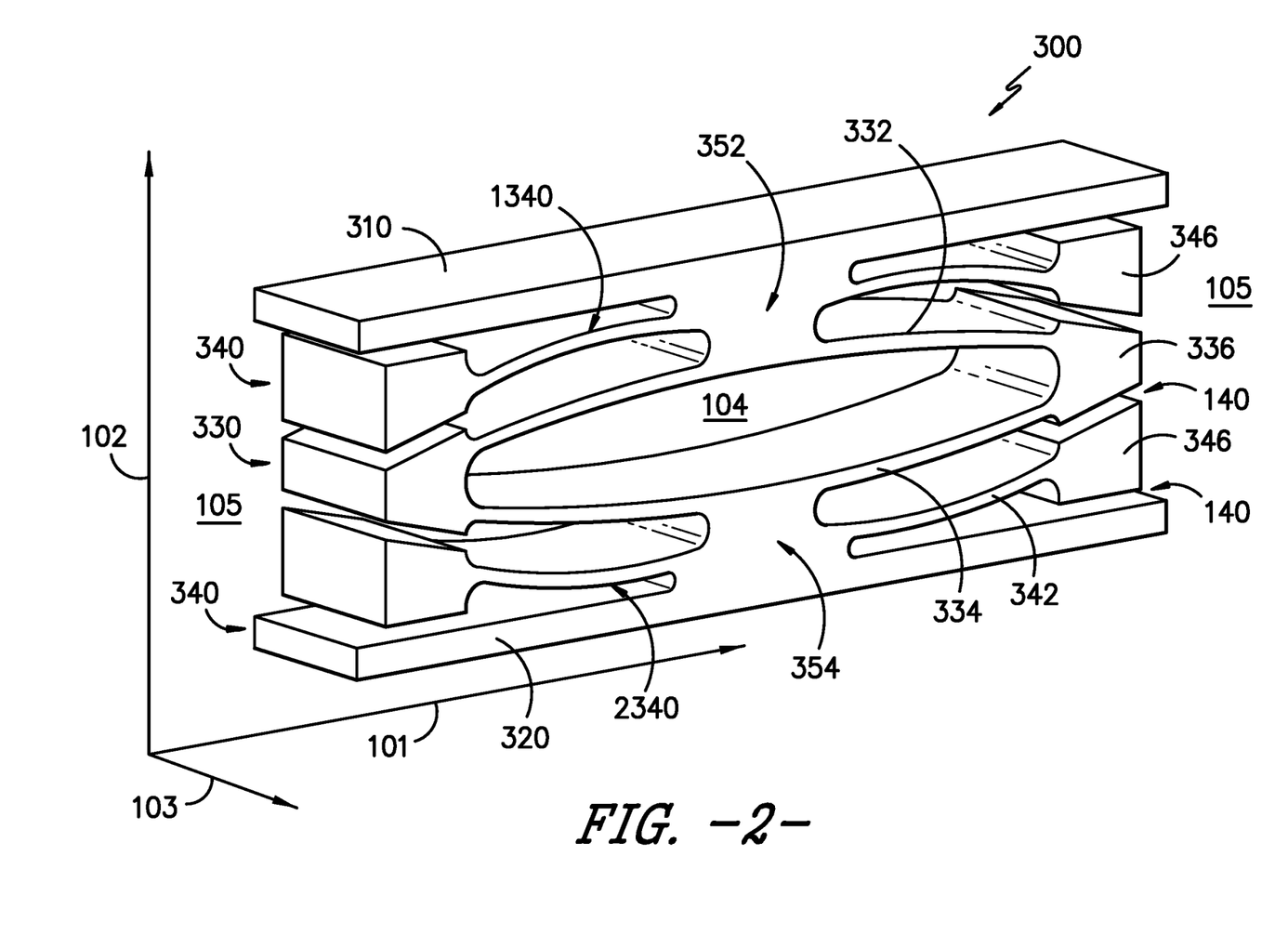
FIGS. 2-10 are exemplary embodiments of the damper system according to aspects of the present disclosure.

Referring now to the drawings, FIG. 1 is a schematic partially cross-sectioned side view of an exemplary gas turbine engine 10 herein referred to as "engine 10" as may incorporate various embodiments of the present invention. The engine 10 may particularly be configured as a gas turbine engine for an aircraft. Although further described herein as a turbofan engine, the engine 10 may define a turboshaft, turboprop, or turbojet gas turbine engine, including marine and industrial engines and auxiliary power units. As shown in FIG. 1, the engine 10 has a longitudinal or axial centerline axis 12 that extends therethrough for reference purposes. An axial direction A is extended co-directional to the axial centerline axis 12 for reference. The engine 10 further defines an upstream end 99 and a downstream end 98 for reference. In general, the engine 10 may include a fan assembly 14 and a core engine 16 disposed downstream from the fan assembly 14.

The core engine 16 may generally include a substantially tubular outer casing 18 that defines an annular inlet 20. The outer casing 18 encases or at least partially forms, in serial flow relationship, a compressor section having a booster or low pressure (LP) compressor 22, a high pressure (HP) compressor 24, a combustion section 26, a turbine section including a high pressure (HP) turbine 28, a low pressure (LP) turbine 30 and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14. In particular embodiments, as shown in FIG. 1, the LP rotor shaft 36 may be connected to the fan shaft 38 via a reduction gear 40 such as in an indirect-drive or geared-drive configuration.

As shown in FIG. 1, the fan assembly 14 includes a plurality of fan blades 42 that are coupled to and that extend radially outwardly from the fan shaft 38. An annular fan casing or nacelle 44 circumferentially may surround the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween. However, it should be appreciated that various configurations of the engine 10 may omit the nacelle 44, or omit the nacelle 44 from extending around the fan blades 42, such as to provide an open rotor or propfan configuration of the engine 10.

It should be appreciated that combinations of the shaft 34, 36, the compressors 22, 24, and the turbines 28, 30 define a rotor assembly 90 of the engine 10. For example, the HP shaft 34, HP compressor 24, and HP turbine 28 may define a high speed or HP rotor assembly of the engine 10. Similarly, combinations of the LP shaft 36, LP compressor 22, and LP turbine 30 may define a low speed or LP rotor assembly of the engine 10. Various embodiments of the engine 10 may further include the fan shaft 38 and fan blades 42 as the LP rotor assembly. In other embodiments, the engine 10 may further define a fan rotor assembly at least partially mechanically de-coupled from the LP spool via the fan shaft 38 and the reduction gear 40. Still further embodiments may further define one or more intermediate rotor assemblies defined by an intermediate pressure compressor, an intermediate pressure shaft, and an intermediate pressure turbine disposed between the LP rotor assembly and the HP rotor assembly (relative to serial aerodynamic flow arrangement).

During operation of the engine 10, a flow of air, shown schematically by arrows 74, enters an inlet 76 of the engine 10 defined by the fan case or nacelle 44. A portion of air, shown schematically by arrows 80, enters the core engine 16 through a core inlet 20 defined at least partially via the outer casing 18. The flow of air 80 is increasingly compressed as it flows across successive stages of the compressors 22, 24, such as shown schematically by arrows 82. The compressed air 82 enters the combustion section 26 and mixes with a liquid or gaseous fuel and is ignited to produce combustion gases 86. The combustion gases 86 release energy to drive rotation of the HP rotor assembly and the LP rotor assembly before exhausting from the jet exhaust nozzle section 32. The release of energy from the combustion gases 86 further drives rotation of the fan assembly 14, including the fan blades 42. A portion of the air 74 bypasses the core engine 16 and flows across the bypass airflow passage 48, such as shown schematically by arrows 78.

The engine 10 further includes a static structure 100 disposed at the rotor assemblies 90 of the engine 10. The static structure 100 may generally form a bearing housing or structural frame to support a static-to-rotating interface. The static structures 100 each support rotation of the rotor assembly 90. Embodiments of the static structure 100 may generally include inner and outer casings and manifolds or conduits to supply and scavenge a lubricant, a damper fluid, or other appropriate fluid at a bearing assembly. The conduits provide and extract a flow of lubricant and/or damper or buffer fluid to and from one or more bearing elements 160 within the static structure 100. The bearing elements 160 are further coupled to one or more rotor assemblies 90 and directly or indirectly to the bearing housing 100. The static structure 100 may further include a damper system 300 (FIGS. 2-10) providing a flow of air, lubricant, or other fluid 108 to dampen or limit vibrations, oscillations, or unbalance from the rotor assembly 90 during operation of the engine 10. The static structure 100 and bearing element 160 generally requires a lubricant, such as oil, to enable rotation of the rotor assembly, reduce heat or thermal accumulation at the static structure 100 and/or bearing element 160, and provide damping of vibrations from rotation of the rotor assembly 90.

Various embodiments of the static structure 100 including the damper system 300 may be disposed at one or more bearing assembly 160 locations at the engine 10. For example, the static structure 100 may be coupled to a LP rotor assembly, a HP rotor assembly, or one or more intermediate pressure or speed rotor assemblies. As another example, the static structure 100 may be coupled to an aft portion of the engine 10, such as at or aft of the combustion section 26.

Referring now to FIGS. 2-10, exemplary embodiments of a damper system 300 are provided. The damper system 300 provided herein may be included at the engine 10 depicted and described in regard to FIG. 1. In particular embodiments, the damper system 300 may be positioned between the static structure 100 and the bearing element 160 to provide one or more benefits described herein.

A coordinate projection defining a first direction 101, a second direction, 102, and a third direction 103 is provided. It should be appreciated that the first direction 101, the second direction 102, and the third direction 103 are generally perpendicular to one another. However, it should further be appreciated that the third direction 103 may extend at least partially along a circumferential direction relative to an axial centerline axis (e.g., axial centerline axis 12 of engine 10). As such, in certain embodiments, the second direction 102 may extend at least partially along a radial direction relative to the axial centerline axis. Still further, the first direction 101 may extend substantially co-directional to the axial direction A of engine 10.

The damper system 300 includes a first wall 310 and a second wall 320 each extended along the first direction 101. The first wall 310 and the second wall 320 are separated along the second direction 102, such as separated perpendicular to the first direction 101. An inner spring 330 is positioned between the first wall 310 and the second wall 320, such as positioned between the first wall 310 and the second wall 320 along the second direction 102. The inner spring 330 includes a first member 332 and a second member 334 each coupled together at a distal end 105, such as coupled together at the distal end 105 along the first direction 101, by an inner bumper 336. The first member 332 and the second member 334 are each contoured toward one another, such as along the second direction 102. The first member 332, the second member 334, and the inner bumper 336 form a cavity 104 therebetween. In certain embodiments, the first member 332, the second member 334, and the inner bumper 336 together form a substantially elliptical cavity 104 with the members 332, 334 contoured toward one another. In still various embodiments, the distal ends 105 are positioned along the first direction 101 relative to the cavity 104, such as distal to a center point of the cavity 104.

The damper system 300 further includes an outer spring 340 positioned between the inner spring 330 and the first wall 310 or the second wall 320. In certain embodiments, one or more of the outer spring 340, such as a first outer spring 1340, is positioned along the second direction 102 between the inner spring 330 and the first wall 310. In still certain embodiments, one or more of the outer spring 340, such as a second outer spring 2340, is positioned along the second direction 102 between the inner spring 330 and the second wall 320. The outer spring 340 includes a spring arm 342 contoured toward the inner spring 330, such as contoured along the second direction 102. The outer spring 340 includes an outer bumper 346 positioned between the inner bumper 336 and the first wall 310 or the second wall 320. In certain embodiments, the outer bumper 346 is positioned along the second direction 102 between the inner bumper 336 and the first wall 310. In still certain embodiments, the outer bumper 346 is positioned along the second direction 102 between the inner bumper 336 and the second wall 320. In various embodiments, the outer bumper 346 at the first outer spring 1340 is selectively couplable to the first wall 310 and the inner bumper 336 at the inner spring 330. In still various embodiments, the outer bumper 346 at the second outer spring 2340 is selectively couplable to the second wall 320 and the inner bumper 336 at the inner spring 330.

The inner bumper 336 and the outer bumper 346 are selectively couplable to one another based on a load 91 applied to the damper system 300. The inner bumper 336 and the outer bumper 346 are selectively opened and closed from one another. The inner bumper 336 and the outer bumper 345 are generally spaced apart, such as depicted at gap 140, at a nominal condition of the damper system 300. In still various embodiments, the outer bumper 346 is generally spaced apart from the first wall 310 and the second wall 320, such as depicted at gap 140, such as at a nominal condition.

Figure 5:
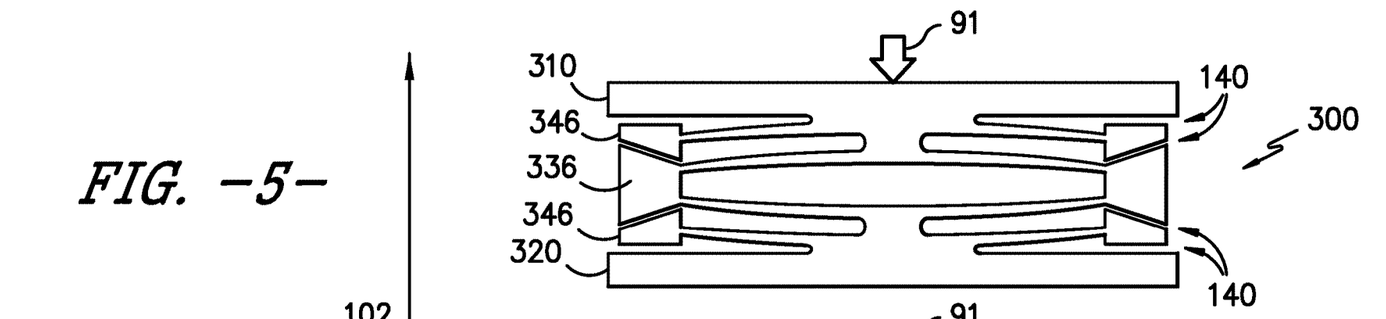
Figure 6:
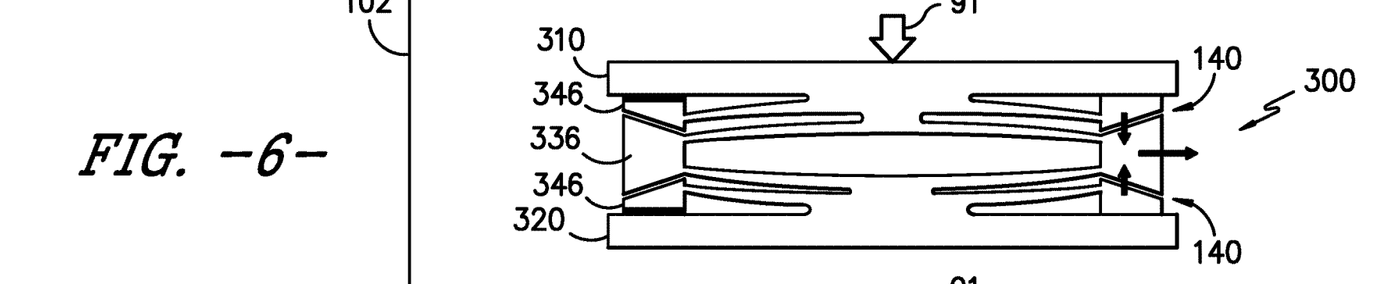
Figure 7:
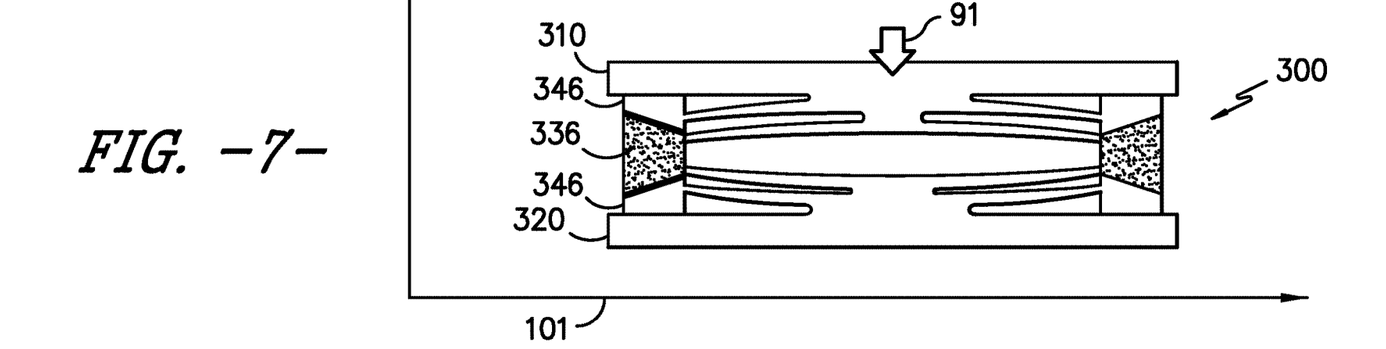

Referring briefly to FIGS. 5-7, depictions of the damper system 300 under various loads is generally provided. In one embodiment of the damper system 300 applied to a system or apparatus such as embodiments of the engine 10 depicted and described in FIG. 1, the engine 10 generates thermal and centrifugal loads from the rotor assembly 90 during operation that vary as a function of the operational parameters or operating conditions of the engine 10. For example, as the rotor assembly 90 increases in rotational speed, the engine 10 produces increasing magnitudes of thrust. The increasing magnitudes of thrust correspond to the increasing loads along the load direction 91. As another example, increasing rotational speeds of the rotor assembly 90 substantially corresponding to increasing thrust loads and increasing temperatures cause the gap 140 to decrease toward zero due to the different stiffnesses of the outer spring 340 and the inner spring 330. As such, the operational parameters may generally include one or more of a thrust output of the engine 10, a temperature of a fluid provided to the damper system 300, or a rotational speed of the rotor assembly 90, or various unbalance conditions described herein, or combinations thereof.

In a particular embodiment, the gap 140 defines a nominal or zero load gap of approximately 0.015 millimeters. However, it should be appreciated that the gap 140 is defined based on a configuration of the engine 10. As such, the nominal or zero load gap condition may be greater or lesser. The damper system 300 may allow for selective opening and closing of the gap 140 (i.e., selective coupling of the bumpers 336, 346 and/or the walls 310, 320) corresponding to the operational parameters or engine condition and a desired stiffness at the engine 10. As another example, at relatively low power conditions (e.g., startup and ignition, idle conditions, etc.), the presence of the gap 140 allows a lower transfer of loads along the load direction 91. In contrast, at high power conditions (e.g., full load condition, takeoff, etc.) or high unbalance conditions, the gap 140 is zero such as to allow full load transfer along the load direction 91. Such selective change in load condition may further provide sufficient stiffness at various conditions while allowing adaptive response (e.g., lower vibratory responses) at low power conditions when the engine 10 defines a bowed rotor condition at the rotor assembly 90.

In various embodiments, the gap 140 is equal to zero when the engine 10 is under an abnormal load operating condition. For example, the abnormal load operating condition generally includes one or more of a high vibration condition of the engine 10, including, but not limited to, one or more conditions resulting from relatively high unbalance of the rotor assembly 90, or high eccentricity condition of the rotor assembly 90 relative to the surrounding casings, such as including the static structure 100. As another example, the abnormal load operating condition is based on one or more of a blade liberation event (e.g., loss or detachment of all or part of a rotating airfoil of the rotor assembly 90, including, but not limited to, one or more of the fan blades 42), or a blade impact event, such as, but not limited to, domestic or foreign object debris damage. Such domestic or foreign object debris damage may include, but is not limited to, bird strikes, hail ingestion, dirt and earth, and engine component breakage or liberation In certain embodiments, the inner bumper 336 and the outer bumper 346 together form an interface 142 at which the bumpers 336, 346 couple to one another. In particular embodiments, the interface 142 is extended along the first direction 101 and the second direction 102. Extension of the interface 142 along the first direction 101 and the second direction 102 allows for the damper system 300 to react or translate motions from the respective directions 101, 102 (e.g., radial and axial loads or motions). The interface 142 may generally be inclined or declined relative to the axial centerline axis 12 (FIG. 1). In certain embodiments, the angle may range acutely between 0 degrees and 75 degrees, or between 0 degrees and 60 degrees, or between 0 degrees and 45 degrees. Furthermore, it should be appreciated that the angle may range between 0 degrees and −75 degrees, between 0 degrees and −60 degrees, or between 0 degrees and −45 degrees.

Referring back to FIGS. 2-10, in some embodiments, the damper system 300 includes a first base portion 352 connected to the first wall 310. The first outer spring 1340 and the inner spring 330 are each connected to the first base portion 352. The first base portion 352 may generally extend along the second direction 102 and position the first outer spring 1340 and the inner spring 330 spaced apart from one another along the second direction 102.

The damper system 300 may include a second base portion 354 connected to the second wall 320. The second outer spring 2340 and the inner spring 330 are each connected to the second base portion 354. The second base portion 354 may generally extend along the second direction 102 and position the second outer spring 2340 and the inner spring 330 spaced apart from one another along the second direction 102.

The first member 332, the second member 334, and the spring arm 342 may generally extend along the first direction 101. In particular embodiments, the first member 332, the second member 334, and the spring arm 342 may generally extend along the first direction 101 from the respective base portion 352, 354. The first member 332, the second member 334, and the spring arm 342 may each generally be spaced apart along the second direction 102 from one another at a nominal load condition, such as described herein in regard to the bumpers 336, 346 and the gap 140. Various embodiments of the damper system 300 include a pair of the outer bumpers 346 positioned at distal ends 105 of the spring arm 342. Further embodiments include a pair of the inner bumpers 336 positioned at distal ends 105 of the first member 332 and the second member 334. The bumpers 336, 346 are positioned in adjacent arrangement along the second direction 102, such as to allow for selective direct coupling of the bumpers 336, 346 to one another.

Figure 3:
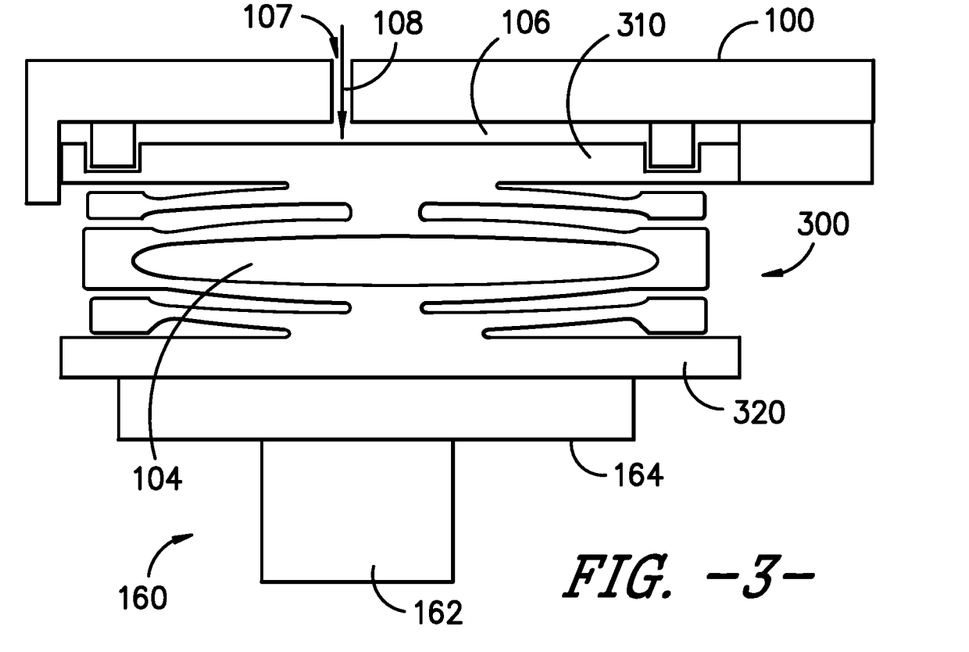
Figure 4:
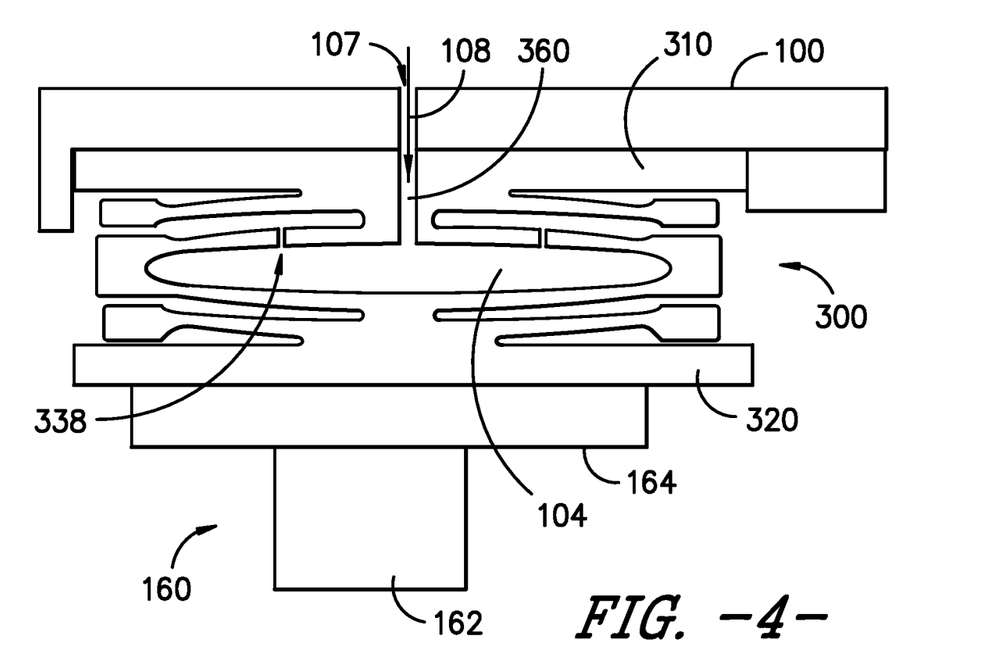

Referring now to FIGS. 3-4, exemplary embodiments of the damper system 300 positioned at the engine 10 are provided. The damper system 300 is positioned along the second direction 102 between the static structure 100 and the bearing element 160. The bearing element 160 includes a rolling element or fluid film 162 and a bearing race 164. The bearing race 164 is coupled to the second wall 320 of the damper system 300. The static structure 100 is coupled to the first wall 310.

In one embodiment, such as depicted in FIG. 3, the static structure 100 includes an opening 107 to allow a flow of lubricant or damper fluid 108 into a plenum 106 formed between the static structure 100 and the damper system 300. In a particular embodiment, the plenum 106 is formed between the static structure 100 and the first wall 310 of the damper system 300. The plenum 106 positioned between the static structure 100 and the damper system 300 may form a squeeze film damper with the multi-variable stiffness element of the damper system 300.

In another embodiment, such as depicted in FIG. 4, the static structure 100 includes an opening 107 to allow a flow of lubricant or damper fluid 108 into a passage 360 formed through the damper system 300. The passage 360 is in fluid communication with the cavity 104 at the inner spring 330. The passage 360 to the cavity 104 allows for the lubricant or damper fluid to enter the cavity 104 such as to form a squeeze film damper at the cavity 104. In one embodiment, the passage 360 is extended along the second direction 102 and formed through the first base portion 352, the outer spring 340, and the inner spring 330. In a particular embodiment, the inner spring 330 includes a perforation 338. In some embodiments, the perforation 338 is extended through the inner spring 330 in fluid communication with the cavity 104. In one embodiment, the perforation 338 is formed at the inner spring 330 between one or both base portions 352, 354 and the inner bumper 336. In particular embodiments, the perforation 338 is formed through the first member 332, the second member 334, or both.

During operation, dynamic pressure, such as during high eccentricity operation of the rotor assembly 90 (e.g., bowed rotor, blade out, foreign object debris, blade liberation, or other high unbalance operation) squeezes lubricant through the passage 360 into the center pressure cavity 104. Velocity of the flow of fluid through the passage 360 may depend on the magnitude of the eccentricity of the rotor assembly. For example, higher velocity flow provides greater damping. Under certain conditions, such as high unbalance operation, the damper system 300 provides higher damping at least in part due to the added viscous force from the flow of fluid through the perforations 338, such as to improve damper capacity. Additionally, for relatively cold fluid flow (e.g., cold lubricant, such as during startup or initial engine operation), excitation is at low eccentricity, such as to provide lower damping. As such, engine stability margin may be improved without adversely affecting nominal vibrations, such as at low eccentricity or nominal conditions.

In certain embodiments, the damper system 300 includes the outer spring 340 and the inner spring 330 as a single, unitary, monolithic structure or component. In various embodiments, the damper system 300 including the first wall 310, the second wall 320, and the springs 330, 340 is a single, unitary, monolithic structure or component. The monolithic component may be formed via 3D-printing or additive manufacturing process. In another embodiment, the damper system 300 includes a shape memory alloy. For example, the damper system 300 generally includes a material configured to define a first shape based on a first operational parameter and a second shape (different from the first shape) based on a second operational parameter different from the first operational parameter. The shape memory alloy generally returns to and from the first shape and the second shape as the operational parameter changes. As such, in one embodiment, the damper system 300 includes the shape memory alloy defining a two-way memory effect. In still various embodiments, the damper system 300 includes, but is not limited to, nickel, titanium, zinc, copper, gold, or iron, or combinations thereof.

In still certain embodiments, portions of the damper system 300 may include various thicknesses, angles, gaps, or passage volumes based on the apparatus, operating conditions, or desired responses. In one embodiment, the spring arm 342 may include a first thickness or cross-sectional area different from one or both of the first member 332 and second member 334. In another embodiment, the first member 332 may include a second thickness or cross sectional area different from the second member 334. In various embodiments, two or more of the spring arms 342 may include thickness or cross-sectional areas different from one another. For instance, the spring arm 342 at the first outer spring 1340 may include a different thickness or cross-sectional area from the spring arm 342 at the second outer spring 2340. In another instance, the spring arm 342 at one or more first outer springs 1340 may include different thicknesses or cross-sectional areas from one or more other first outer springs 1340. In yet another instance, the spring arm 342 at one or more second outer springs 2340 may include different thicknesses or cross-sectional areas from one or more other second outer springs 2340.

Figure 8:
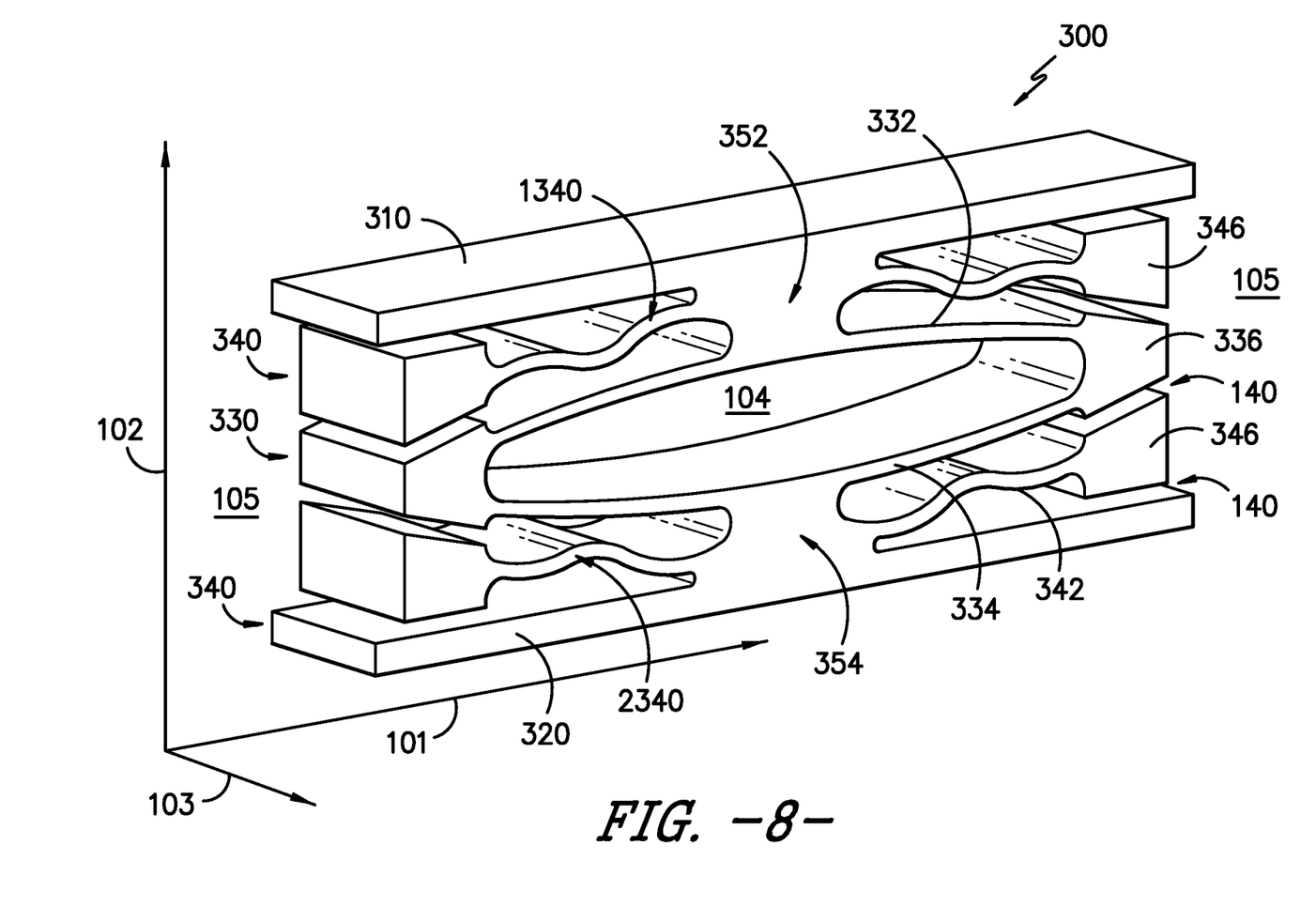
Figure 9:
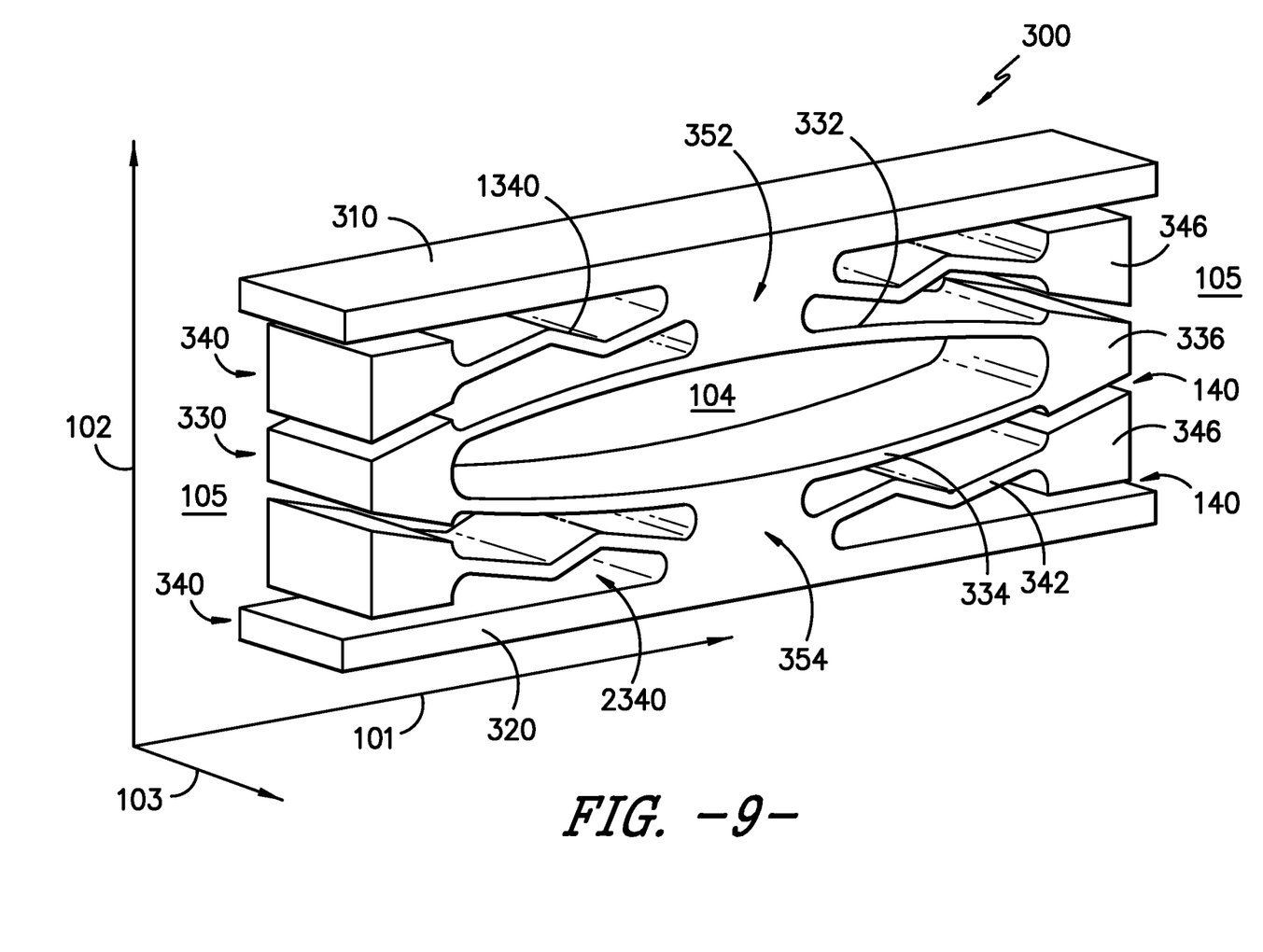
Figure 10:
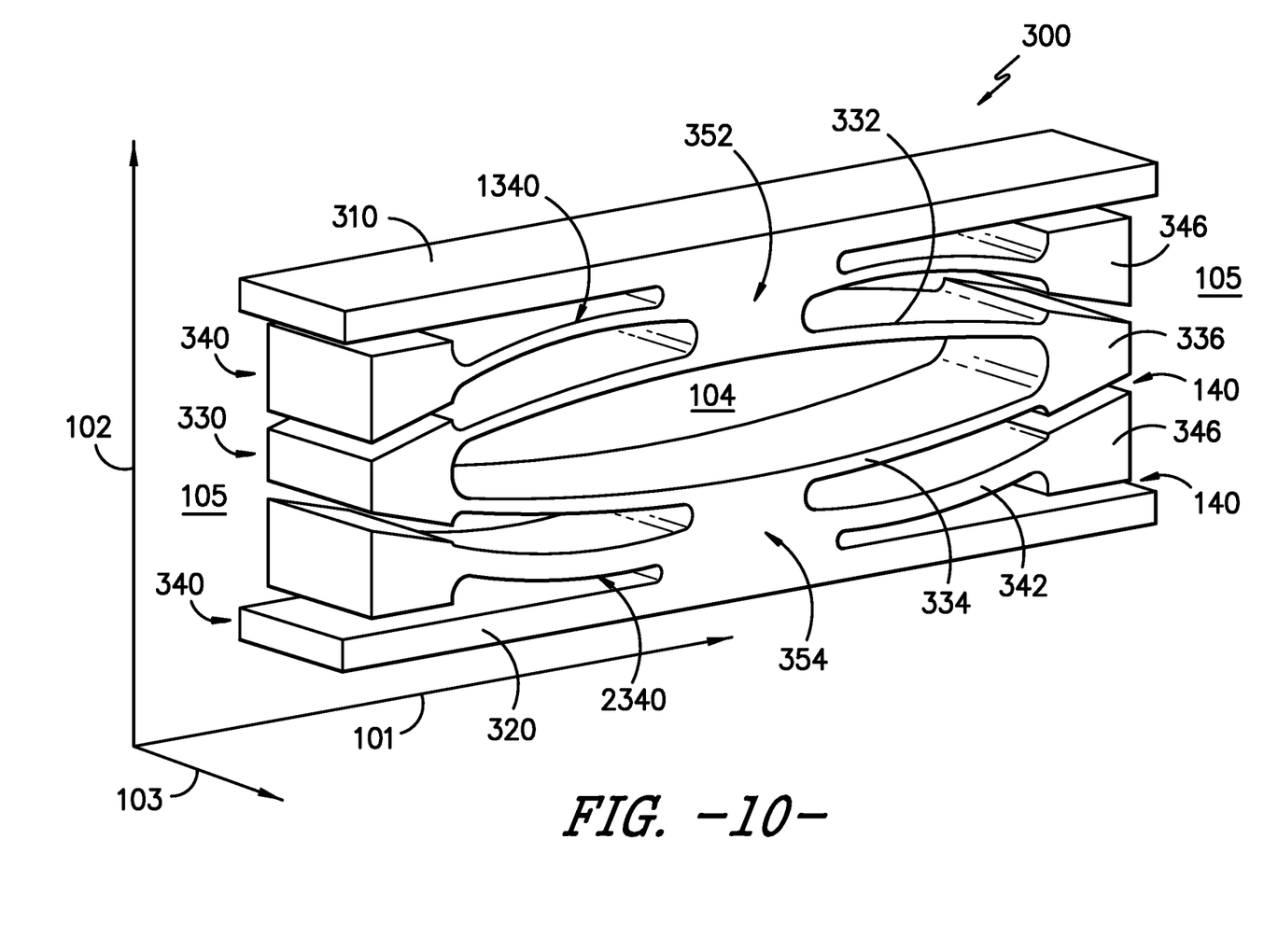

In various embodiments, the spring arm 342, the first member 332, and the second member 334 may include thickness variations. In one embodiment, such as depicted in FIG. 8, the thickness variation may form a sinusoidal distribution. In a particular embodiment, the sinusoidal distribution may be formed or extended along the first direction 101. In another embodiment, such as depicted in FIG. 9, the spring arm 342 may extend angularly, such as a triangle wave. In yet another embodiment, such as depicted in FIG. 10, the spring arms 342 may have thickness different from one another. In still other embodiments, the spring arm 342, the first member 332, and the second member 334 may extend straight along the first direction 101 or co-directional to the first wall 310 or the second wall 320. In still yet other embodiments, the spring arm 342, the first member 332, and the second member 334 may extend at an acute angle. In still various embodiments, the spring arm 342, the first member 332, or the second member 334 may be symmetric or asymmetric relative to one another. In yet various embodiments, the gap 140 may differ between one or both walls 310, 320 and the outer bumper 346, or may differ between the outer bumper 346 and the inner bumper 336 with respect to one another or with respect to one or both walls 310, 320.

Referring back to FIG. 1, the engine 10 may further include a controller 210. In general, the controller 210 can correspond to any suitable processor-based device, including one or more computing devices. For instance, FIG. 1 illustrates one embodiment of suitable components that can be included within the controller 210. As shown in FIG. 1, the controller 210 can include a processor 212 and associated memory 214 configured to perform a variety of computer-implemented functions (e.g., adjusting or modulating a temperature at the damper system 300 via the flowrate, pressure, and/or temperature of fluid through the passage 360).

As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits. Additionally, the memory 214 can generally include memory element(s) including, but not limited to, computer readable medium (e.g., random access memory (RAM)), computer readable non-volatile medium (e.g., flash memory), a compact disc-read only memory (CD-ROM), a magneto-optical disk (MOD), a digital versatile disc (DVD) and/or other suitable memory elements or combinations thereof. In various embodiments, the controller 210 may define one or more of a full authority digital engine controller (FADEC), a propeller control unit (PCU), an engine control unit (ECU), or an electronic engine control (EEC).

As shown, the controller 210 may include control logic 216 stored in memory 214. The control logic 216 may include instructions that when executed by the one or more processors 212 cause the one or more processors 212 to perform operations such as to adjust or vary the stiffness or damping response of the damper system 300. The operations may include selectively flowing, to the cavity 104, fluid 108 to adjust the gap 140 between two or more of the first wall 310, the second wall 320, the inner bumper 336, and the outer bumper 346. The operations may include selectively flowing, to the plenum 106, fluid 108 between the first wall 310 and the static structure 100. The operations may include selectively adjusting the gap 140 based at least on a physical parameter of the fluid 108. The operations may include selectively adjusting the physical parameter of the fluid 108 based on a desired response of the damper system 300. The desired response of the damper system 300 may be based at least in part on selectively opening and closing the gap 140 between two or more of the first wall 310, the second wall 320, the inner bumper 336, and the outer bumper 346. The desired response of the damper system 300 may be based at least in part on selectively flowing the fluid 108 to the plenum 106. The physical parameter may include one or more of a temperature, viscosity, density, heat flux, pressure, or other physical parameter of the fluid 108.

Additionally, as shown in FIG. 1, the controller 210 may also include a communications interface module 230. In various embodiments, the communications interface module 230 can include associated electronic circuitry that is used to send and receive data. As such, the communications interface module 230 of the controller 210 can be used to receive data from the rotor assembly 90, the static structure 100, the bearing element 160, or sensors proximate or attached thereto providing an operational parameter, such as thrust output, surface or fluid temperature, rotational speed, vibration or acceleration, pressure, or flow rate. In addition, the communications interface module 230 can also be used to communicate with any other suitable components of the engine 10, including any number of sensors configured to monitor one or more operating parameters of the engine 10. It should be appreciated that the communications interface module 230 can be any combination of suitable wired and/or wireless communications interfaces and, thus, can be communicatively coupled to one or more components of the engine 10 via a wired and/or wireless connection. As such, the controller 210 may modulate damper response of the damper system 300 via the flow of fluid 108 through the passage 360. In certain embodiments, the controller 210 may modulate thermal communication, such as the temperature of the fluid 108 provided to the damper system 300 and provided to one or more of the cavity 104 or the plenum 106.

The controller 210 may generally modulate thermal communication of the flow of fluid with the damper system 200 based at least on an operational parameter or engine operating condition. Still further, the controller 210 may adjust damper response of the damper system 300 in direct relationship to the operational parameter or engine operating condition (e.g., increase temperature with increases in the operational parameter, decrease temperature with decreases in the operational parameter, etc.).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A damper system, the damper system comprising a first wall extended along a first direction; a second wall extended along the first direction, wherein the first wall and the second wall are separated along a second direction perpendicular to the first direction; an inner spring positioned between the first wall and the second wall along the second direction, wherein the inner spring comprises a first member and a second member each coupled together at a distal end along the first direction by an inner bumper, and wherein the first member, the second member, and the inner bumper form a cavity therebetween; and an outer spring positioned along the second direction between the inner spring and the first wall or the second wall, wherein the outer spring comprises a spring arm contoured along the second direction toward the inner spring, and wherein the outer spring comprises an outer bumper positioned along the second direction between the inner bumper and the first wall or the second wall, and wherein the inner bumper and the outer bumper are selectively couplable to one another based on a load applied to the damper system.

2. The damper system of any clause herein, wherein the inner bumper and the outer bumper together form an interface extended along the first direction and the second direction, wherein the inner bumper and the outer bumper are selectively couplable at the interface.

3. The damper system of any clause herein, wherein the outer bumper is selectively couplable to the first wall or the second wall.

4. The damper system of any clause herein, wherein a passage is formed through the first wall, the outer spring, and the inner spring in fluid communication with the cavity at the inner spring.

5. The damper system of any clause herein, wherein the first wall, the second wall, the outer spring, and the inner spring are together a unitary, monolithic component.

6. The damper system of any clause herein, the wherein the outer spring comprises a first outer spring positioned along the second direction between the first wall and the inner spring; and a second outer spring positioned along the second direction between the second wall and the inner spring.

7. The damper system of any clause herein, wherein the outer bumper at the first outer spring is selectively couplable to the first wall and the inner bumper at the inner spring, and wherein the outer bumper at the second outer spring is selectively couplable to the second wall and the inner bumper at the inner spring.

8. The damper system of any clause herein, the damper system comprising a first base portion connected to the first wall and extended along the second direction, wherein the first outer spring and the inner spring are each connected to the first base portion, and wherein the first base portion positions the first outer spring and the inner spring spaced apart from one another along the second direction.

9. The damper system of any clause herein, the damper system comprising a second base portion connected to the second wall and extended along the second direction, wherein the second outer spring and the inner spring are each connected to the second base portion, and wherein the second base portion positions the second outer spring and the inner spring spaced apart from one another along the second direction.

10. The damper system of any clause herein, wherein the first member, the second member, and the spring arm are each extended along the first direction.

11. The damper system of any clause herein, wherein the first member, the second member, and the spring arm are each spaced apart along the second direction from one another at a nominal load condition.

12. The damper system of any clause herein, wherein the outer bumper and the inner bumper are spaced apart from one another at a nominal load condition.

13. The damper system of any clause herein, wherein the first member comprises a perforation allowing fluid communication to the cavity at the inner spring.

14. The damper system of any clause herein, wherein the inner spring forms a substantially elliptical cross section at the cavity formed by the first member, the second member, and the inner bumper.

15. The damper system of any clause herein, wherein the inner spring comprises a pair of the inner bumper at distal ends separated along the first direction, and wherein the outer spring comprises a pair of the outer bumper distal ends separated along the first direction, and wherein the outer bumper is spaced apart and adjacent along the second direction to the inner bumper at the respective distal end.

16. The damper system of any clause herein, the damper system comprising a static structure connected to the first wall; bearing assembly connected to the second wall.

17. The damper system of any clause herein, wherein the static structure, the first wall, the outer spring, and the inner spring together form a passage extended therethrough in fluid communication with the cavity at the inner spring, wherein the passage is configured to receive a fluid at the cavity.

18. The damper system of any clause herein, wherein the spring arm at the outer spring comprises a first thickness different from a second thickness at one or both of the first member or the second member at the inner spring.

19. The damper system of any clause herein, wherein the first member and the second member are each contoured toward one another along the second direction, 20. A system, the system comprising a rotor assembly mounted to a static structure via a bearing assembly, wherein the static structure and the bearing assembly are connected to one another at least by a damper element, wherein the damper element comprises a first wall extended along a first direction; a second wall extended along the first direction, wherein the first wall and the second wall are separated along a second direction perpendicular to the first direction; an inner spring positioned between the first wall and the second wall along the second direction, wherein the inner spring comprises a first member and a second member each coupled together at a distal end along the first direction by an inner bumper, wherein the first member and the second member are each contoured toward one another along the second direction, and wherein the first member, the second member, and the inner bumper form a cavity therebetween; and an outer spring positioned along the second direction between the inner spring and the first wall or the second wall, wherein the outer spring comprises a spring arm contoured along the second direction toward the inner spring, and wherein the outer spring comprises an outer bumper positioned along the second direction between the inner bumper and the first wall or the second wall, and wherein the inner bumper and the outer bumper are selectively couplable to one another based on a load applied to the first wall or the second wall.

21. The system of any clause herein, wherein the system is a gas turbine engine.

What is claimed is:

1. A damper system, the damper system comprising:
a first wall extended along a first direction;
a second wall extended along the first direction, wherein the first wall and the second wall are separated along a second direction perpendicular to the first direction;
an inner spring positioned between the first wall and the second wall along the second direction, wherein the inner spring comprises a first member and a second member each coupled together at a distal end along the first direction by an inner bumper, and wherein the first member, the second member, and the inner bumper form a cavity therebetween; and
an outer spring comprising:
a first outer spring positioned along the second direction between the first wall and the inner spring; and
a second outer spring positioned along the second direction between the second wall and the inner spring,
wherein the outer spring comprises a spring arm contoured along the second direction toward the inner spring, and
wherein the outer spring comprises an outer bumper positioned along the second direction between the inner bumper and the first wall or the second wall, and
wherein the inner bumper and the outer bumper are selectively couplable to one another based on a load applied to the damper system.

2. The damper system of claim 1,
wherein the inner bumper and the outer bumper together form an interface extended along the first direction and the second direction,
wherein the inner bumper and the outer bumper are selectively couplable at the interface.

3. The damper system of claim 1, wherein the outer bumper is selectively couplable to the first wall or the second wall.

4. The damper system of claim 1, wherein a passage is formed through the first wall, the outer spring, and the inner spring in fluid communication with the cavity at the inner spring.

5. The damper system of claim 1, wherein the first wall, the second wall, the outer spring, and the inner spring are together a unitary, monolithic component.

6. The damper system of claim 1,
wherein the outer bumper at the first outer spring is selectively couplable to the first wall and the inner bumper at the inner spring, and
wherein the outer bumper at the second outer spring is selectively couplable to the second wall and the inner bumper at the inner spring.

7. The damper system of claim 1, the damper system comprising:
a first base portion connected to the first wall and extended along the second direction,
wherein the first outer spring and the inner spring are each connected to the first base portion, and
wherein the first base portion positions the first outer spring and the inner spring spaced apart from one another along the second direction.

8. The damper system of claim 1, the damper system comprising:
a second base portion connected to the second wall and extended along the second direction,
wherein the second outer spring and the inner spring are each connected to the second base portion, and
wherein the second base portion positions the second outer spring and the inner spring spaced apart from one another along the second direction.

9. The damper system of claim 1, wherein the first member, the second member, and the spring arm are each extended along the first direction.

10. The damper system of claim 9, wherein the first member, the second member, and the spring arm are each spaced apart along the second direction from one another at a nominal load condition.

11. The damper system of claim 1, wherein the outer bumper and the inner bumper are spaced apart from one another at a nominal load condition.

12. The damper system of claim 1, wherein the first member comprises a perforation allowing fluid communication to the cavity at the inner spring.

13. The damper system of claim 1, wherein the inner spring forms a substantially elliptical cross section at the cavity formed by the first member, the second member, and the inner bumper.

14. The damper system of claim 1,
wherein the inner spring comprises a pair of the inner bumper at distal ends separated along the first direction, and
wherein the outer spring comprises a pair of the outer bumper distal ends separated along the first direction, and
wherein the outer bumper is spaced apart and adjacent along the second direction to the inner bumper at the respective distal end.

15. The damper system of claim 1, the damper system comprising:
a static structure connected to the first wall; and
a bearing assembly connected to the second wall.

16. The damper system of claim 15,
wherein the static structure, the first wall, the outer spring, and the inner spring together form a passage extended therethrough in fluid communication with the cavity at the inner spring,
wherein the passage is configured to receive a fluid at the cavity.

17. The damper system of claim 1, wherein the spring arm at the outer spring comprises a first thickness different from a second thickness at one or both of the first member or the second member at the inner spring.

18. The damper system of claim 1, wherein the first member and the second member are each contoured toward one another along the second direction.

19. A system, the system comprising:
a rotor assembly mounted to a static structure via a bearing assembly, wherein the static structure and the bearing assembly are connected to one another at least by a damper element, wherein the damper element comprises:

a first wall extended along a first direction;

a second wall extended along the first direction, wherein the first wall and the second wall are separated along a second direction perpendicular to the first direction;

an inner spring positioned between the first wall and the second wall along the second direction, wherein the inner spring comprises a first member and a second member each coupled together at a distal end along the first direction by an inner bumper, wherein the first member and the second member are each contoured toward one another along the second direction, and wherein the first member, the second member, and the inner bumper form a cavity therebetween; and an outer spring positioned along the second direction between the inner spring and the first wall or the second wall, wherein the outer spring comprises a spring arm contoured along the second direction toward the inner spring, and wherein the outer spring comprises an outer bumper positioned along the second direction between the inner bumper and the first wall or the second wall, wherein the inner bumper and the outer bumper are selectively couplable to one another based on a load applied to the first wall or the second wall, and wherein the first member comprises a perforation allowing fluid communication to the cavity at the inner spring.

* * * * *